United States Patent [19]
Katohno et al.

[11] Patent Number: 5,703,737
[45] Date of Patent: Dec. 30, 1997

[54] MAGNETIC RECORDING REPRODUCTION APPARATUS WITH IMPROVED ADJUSTMENT CHARACTERISTICS FOR AUDIO-CONTROL HEAD

[75] Inventors: Noboru Katohno, Mito; Yoshihisa Tsurumi, Hitachinaka; Chikara Iwama, Hitachiota, all of Japan

[73] Assignee: Hitachi, Ltd., Japan

[21] Appl. No.: 558,181

[22] Filed: Nov. 15, 1995

[30] Foreign Application Priority Data

Nov. 18, 1994 [JP] Japan .................. 6-284616

[51] Int. Cl.$^6$ .................. G11B 5/56; G11B 21/14
[52] U.S. Cl. .................. 360/109
[58] Field of Search .................. 360/109

[56] References Cited

U.S. PATENT DOCUMENTS 5,479,307  12/1995  Lee .................. 360/109

FOREIGN PATENT DOCUMENTS 62-13221  4/1987  Japan .

*Primary Examiner*—Robert S. Tupper
*Attorney, Agent, or Firm*—Evenson, McKeown, Edwards & Lenahan, P.L.L.C.

[57] ABSTRACT

In a magnetic recording and reproduction apparatus, for simplifying the structure of a fixing device of an audio-control head and for decreasing the number of adjustment procedures, a synthetic resin part formed of a plate member is molded of a resin integrally with a shaft part extending in a through hole in a base and with a fixed part provided on the opposite surface of the base to the surface of the base on which the plate member is provided, so that the synthetic resin part can be rotated around the through hole; an audio-control head is provided on a head plate, which is pressed toward the base by a spring fitted on a spring fixing screw; and three adjustment screws include screw parts which support the head plate, and cylindrical parts which abut against the surface of the base through holes bored through the synthetic resin part. Positioning of the audio-control head in a moving direction of a magnetic tape is effected by an adjustment jig between a notch on the synthetic resin part and a projection part on the base. Two of the adjustment screws are located on a straight line passing the center of the through hole in the base and the center of a control head, which positions are on the front and rear sides of the control head. Mainly, the height of the audio-control head is adjusted by one of the adjustment screws, the inclination angle θ is adjusted by another adjustment screw, and the azimuth angle is adjusted by the other one.

2 Claims, 4 Drawing Sheets

MAGNETIC RECORDING REPRODUCTION APPARATUS WITH IMPROVED ADJUSTMENT CHARACTERISTICS FOR AUDIO-CONTROL HEAD

BACKGROUND OF THE INVENTION

The present invention relates to a magnetic recording and reproduction apparatus and, more particularly, to a structure for fixing an audio-control head in a video tape recorder (VTR) for home use.

In a magnetic recording and reproduction apparatus with a magnetic tape, such as a VTR, an audio signal and a control signal recorded on the magnetic tape are read by an audio-control head at the time of reproduction so as to control the position of information recorded on the magnetic tape. In order to control the reproduction position of this recorded information with a predetermined accuracy, the audio-control head must be accurately positioned and fixed in the apparatus.

However, position adjustments in the following four directions are required for fixing the audio-control head, and consequently, the structure for the position adjustments becomes complicated.

(1) X-direction (horizontal direction) to control timing for reading a control signal.

(2) Z-direction (vertical direction) to align the audio-control head with the recording position of a control signal and an audio signal on the magnetic tape.

(3) θ-direction (tilt adjustment) to control a state of contact of the audio-control head with the magnetic tape.

(4) azimuth direction (azimuth angle direction) to adjust the direction of a gap of the audio-control head to the azimuth angle of an audio signal on the magnetic tape.

FIGS. 5A and 5B show one example of a conventional structure for adjusting the fixing position of an audio-control head. FIG. 5A is a partially broken-away side view of the structure, and FIG. 5B is a plan view of the same.

As shown in FIGS. 5A and 5B, an audio-control head 40 is provided on a head plate 30 which is fastened on a head fixing plate 202 by a head fixing screw 200. The head fixing plate 202 is pivotally connected to a shaft 203 so as to rotate above a base 100. More specifically, the shaft 203 secured on the base 100 is penetrated through the head fixing plate 202, and a torsion compression spring 204 wound around the shaft 203 supports the head fixing plate 202. The head fixing plate 202 is fixed, via a rotating hollow shaft 205 which is secured in a hole in the head fixing plate 202 by caulking, by a nut 206 screwed on an upper end of the shaft 203. A taper nut shaft 209 is provided on the base 100, and a taper nut 210 having inner and outer surfaces threaded is fitted on the taper nut shaft 209. The taper nut 210 is in contact with a side surface of the head fixing plate 202.

The positional adjustment of the audio-control head 40 in the X-direction is effected by controlling the height of the taper nut 210 and rotating the head fixing plate 202 around the shaft 203. For this purpose, the head fixing plate 202 is pressed toward the taper nut 210 by the torsion compression spring 204.

An angle θ is controlled by changing the lengths of engagement of adjustment screws 201, 211 and so forth. More specifically, one end of the head plate 30 is supported on the head fixing plate 202 by a head plate supporter 208, and also, the head plate 30 is pressed toward the head fixing plate 202 by a compression spring 207 wound around the head fixing screw 200. Consequently, the head plate 30 is rotated around the head plate supporter 208 in the θ-direction by a degree corresponding to the lengths of engagement of the adjustment screws 201, 211 and so forth.

Moreover, the azimuth adjustment is effected by controlling the lengths of engagement of the adjustment screws 201, 211 and so forth relative to each other.

Incidentally, JP-Y2-62-13221 discloses a structure in which a fixing member for an audio-control head is rotatably urged by a spring or the like, and an end portion of the fixing member for the audio-control head is abutted against a tapered member to control the position of the audio-control head in the vertical direction, thereby adjusting the position of the audio-control head in a running direction of a magnetic tape.

In the conventional apparatus described above, the structure for adjusting the fixing position of the audio-control head is so complicated that the number of component parts is large, and that the number of assembly and adjustment steps is large.

SUMMARY OF THE INVENTION

It is an object of the present invention to provide a magnetic recording and reproduction apparatus which can largely decrease the number of component parts of the above-described conventional apparatus and also can decrease the number of assembly and adjustment steps.

In order to solve the above-described problems, according to the invention, a magnetic recording and reproduction apparatus includes a synthetic resin part provided on a base on which a rotary cylinder is mounted, means for positioning a head plate on the synthetic resin part, the head plate having an audio-control head provided thereon, and means for pressing the head plate and the synthetic resin part on the base. Further, the synthetic resin part comprises a plate part provided on the surface of the base on the head plate side, a shaft part extending in a through hole which is bored in the base, and a fixed part which is formed on the bottom surface of the base which is opposite to the surface thereof mounting the above-mentioned parts, and these plate part, shaft part and fixed part are molded of a resin integrally. The position of the audio-control head with respect to a moving direction of a magnetic tape is determined by rotating the synthetic resin part around the through hole.

The outer diameter of the fixed part of the synthetic resin part is larger than the diameter of the through hole bored in the base.

The means for positioning the head plate on the synthetic resin part comprise three adjustment screws, each having a cylindrical part on the tip, which are engaged in three tapped holes formed in the head plate, each of the cylindrical parts of the adjustment screws being inserted in one of three holes bored through the synthetic resin part, respectively, so as to abut against the surface of the base.

Two of the three adjustment screws are located at positions on a straight line passing the center of the through hole and the center of a control head of the audio-control head, which positions are on the front and rear sides of the audio-control head.

The plate part of the synthetic resin part which is provided on the surface of the base on the head plate side is integrally formed with the fixed part on the bottom surface of the base through the through hole in the base, and the outer diameter of the fixed part is larger than the diameter of the through hole. Therefore, the synthetic resin part can be rotated around the through hole without coming off the base. By the amount of this rotation, the position of the audio-control head in the X-direction is determined.

At this time, the cylindrical parts of the three adjustment screws are slid while pressed on the surface of the base by the above-mentioned pressing means.

Two of the adjustment screws are located at positions on a straight line passing the center of the through hole and the center of the control head of the audio-control head. By the length of engagement of one of the two adjustment screws which is located on the front side of the audio-control head, the height of the audio-control head is mainly determined. The angle θ of the audio-control head is mainly determined by the length of engagement of the other adjustment screw which is located on the rear side.

By the length of engagement of the third adjustment screws other than the foregoing two adjustment screws, the azimuth angle of the audio-control head is mainly determined.

DETAILED DESCRIPTION OF THE PREFERRED EMBODIMENT

Figure 4:
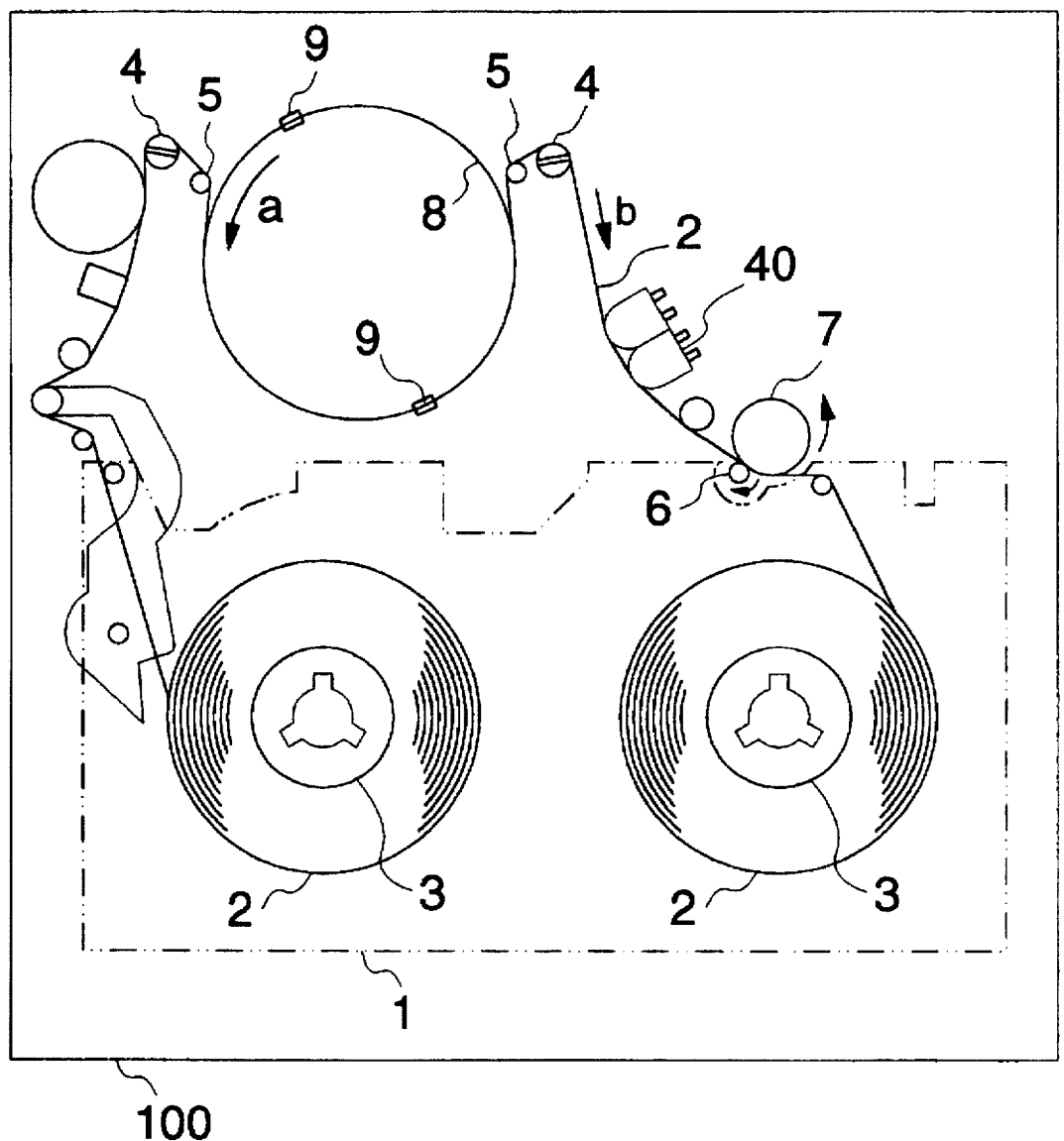
FIG. 4 is a plan view showing a tape traveling system of a VTR.

An explanation will firstly be given on the fixing position of an audio-control head in a VTR with reference to FIG. 4.

In a VTR 100 shown in FIG. 4, a magnetic tape 2 is drawn from a cassette 1 by magnetic tape guides 4 and 5 and extended around a rotating cylinder 8. The cylinder 8, on which a rotary head 9 is provided, rotates in a direction a.

An audio-control head 40 is located between the cylinder 8 and a capstan 6. The magnetic tape 2 is moved in a direction b by the capstan 6 and a pinch roller 7. At the time of recording, a video signal is recorded on the magnetic tape 2 by the rotary head 9, and also, an audio signal is recorded on the magnetic tape 2 by the audio-control head 40. At the time of reproduction, the video signal recorded on the magnetic tape 2 is read by the rotary head 9 whereas the audio signal and a control signal are read by the audio-control head 40.

In order to increase accuracy in the rotation phase of the cylinder 8, the control of moving timing of the magnetic tape 2, and so forth, positioning of the audio-control head 40, especially a high positional accuracy of the audio-control head 40 with respect to the moving direction of the magnetic tape 2, is required.

The present invention relates to fixing of this audio-control head 40, which will now be described more specifically with reference to FIGS. 1, 2 and 3.

Figure 1:
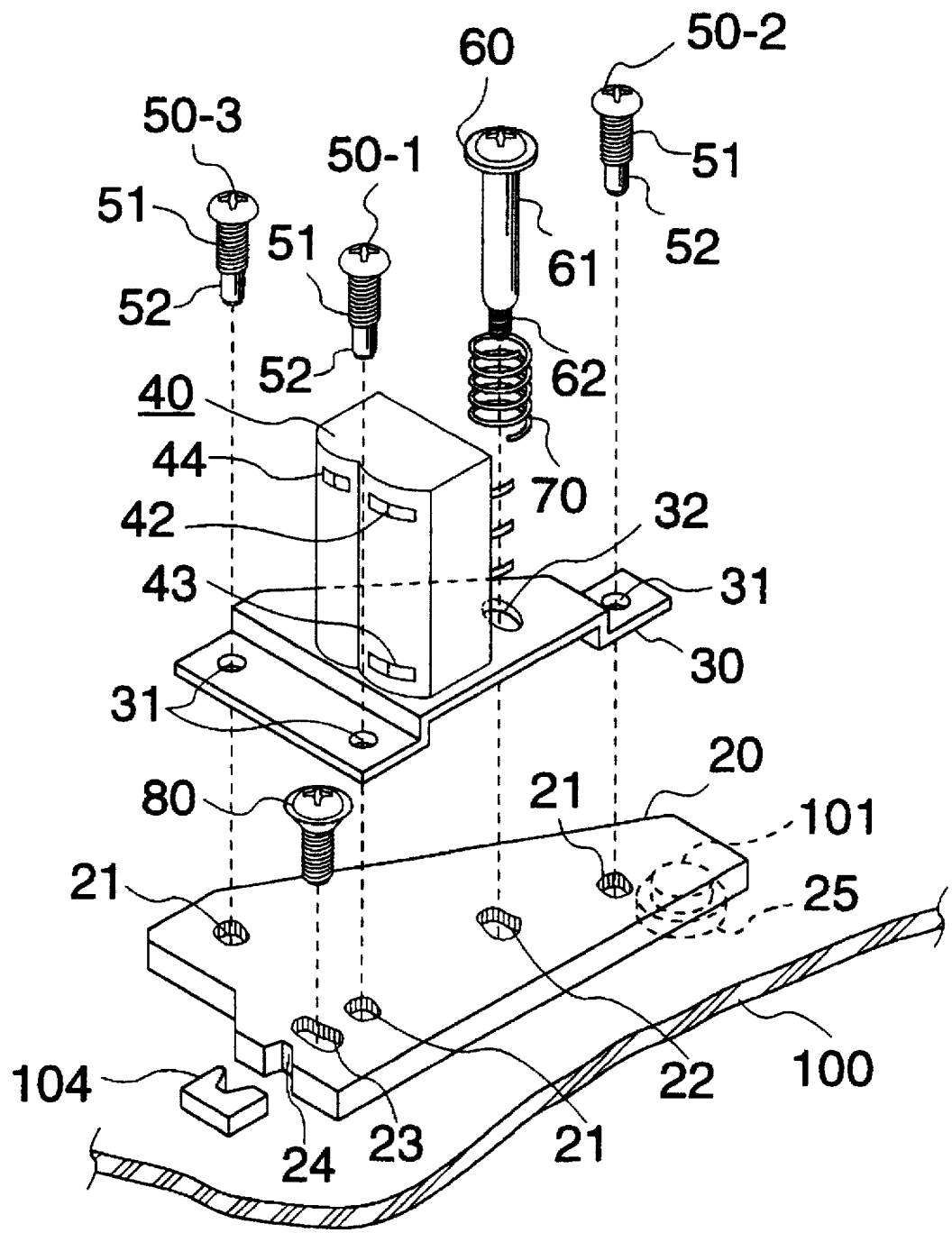
FIG. 1 is a diagram showing a head fixing device according to the present invention.

FIG. 1 is an exploded perspective view showing a fixing device for the audio-control head 40 according to the invention; FIG. 2 is a vertical cross-sectional view of the fixing device; and FIG. 3 is a plan view of the same.

Figure 2:
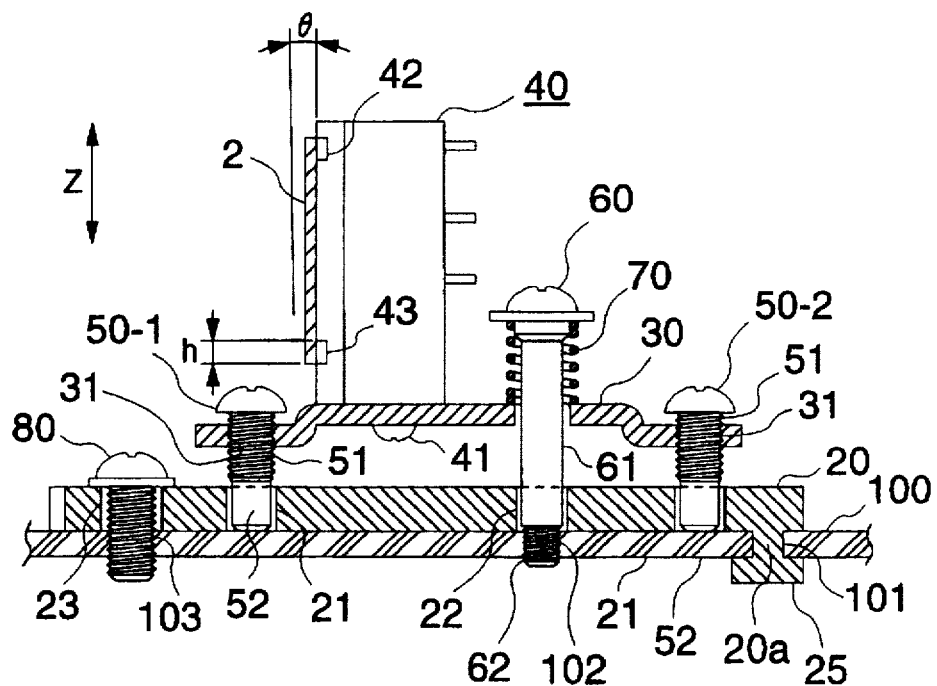
FIG. 2 is a vertical cross-sectional view showing the head fixing device according to the invention.

As shown in FIG. 1, the audio-control head 40 comprises an audio head 42 and a control head 43, and is fixed on a head plate 30 by a head fixing screw 41 shown in FIG. 2. The positions of gaps of these two heads 42 and 43 are vertically aligned with each other. The audio-control head 40 also includes an erasing head 44 which is located by the side of the audio head 42.

The head plate 30 includes three tapped holes 31 in which adjustment screws 50-1 to 50-3 are engaged. The adjustment screws 50-1 to 50-3 each comprises a screw part 51 in an intermediate portion thereof and a cylindrical part 52 in the tip. The cylindrical parts 52 of the adjustment screws 50-1 to 50-3 are inserted in three holes 21 which are formed in a plate member 20 made of a synthetic resin, as shown in FIG. 2.

Further, the head plate 30 includes a long-shape hole 32 in which a spring fixing screw 60 is inserted through a spring 70. The spring fixing screw 60 comprises a cylindrical part 61 in an intermediate portion thereof and a screw part 62 in the tip, the screw part 62 having a smaller diameter than the cylindrical part 61. As shown in FIG. 2, this smaller-diameter screw part 62 is passed through a long-shape hole 22 formed in the synthetic resin part 20, and is driven into a tapped hole 102 formed in a base 100.

As a result, the head plate 30 is pressed toward the base 100 by the load of the spring 70 of the spring fixing screw 60, and the cylindrical parts 52 of the three adjustment screws 50-1 to 50-3 are abutted against the surface of the base 100.

The synthetic resin part 20 consisting of a plate member is formed, by ejection molding, to cover the top surface of the base 100. Also, the synthetic resin part 20 is integrally formed with a fixed part 25 to be located on the bottom surface of the base 100 which is opposite to the surface mounting other elements, through a shaft part 20a extending in a through hole 101 in the base 100. At this time, the fixed part 25 is formed to have an outer diameter larger than the diameter of the through hole 101, thereby preventing the synthetic resin part 20 from coming off the base 100. Since the synthetic resin part 20 is slightly shrunk when it is cooled and solidified after ejection molding, a small gap is formed between the shaft part 20a and the through hole 101 so that the synthetic resin part 20 formed of a plate member can be rotated around the shaft part 20a which is located in the through hole 101 in the base 100.

In the present invention, positioning of the audio-control head 40 in the X-direction is effected by rotating the above-described synthetic resin part 20.

For this purpose, the long-shape hole 22 in the synthetic resin part 20 is located to surround the tapped hole 102 (FIG. 2) in the base 100, and likewise, a long-shape hole 23 is formed at a position to surround a tapped hole 103 (FIG. 2), so that the synthetic resin part 20 can be rotated around the through hole 101 and the shaft part 20a.

Further, a notch 24 is formed in an end portion of the synthetic resin part 20 on the far side from the through hole 101, and a projection part 104 is provided on the base 100 at a position to confront the notch 24.

The amount of rotation of the synthetic resin part 20 can be easily controlled by rotating an adjustment jig of, for example, a screwdriver type which is inserted between the notch 24 and the projection part 104. Incidentally, the base 100 is made of a hard material such as a steel plate.

Next, a method for position adjustment by the audio-control head fixing device having the above-described structure will be described.

Figure 3:
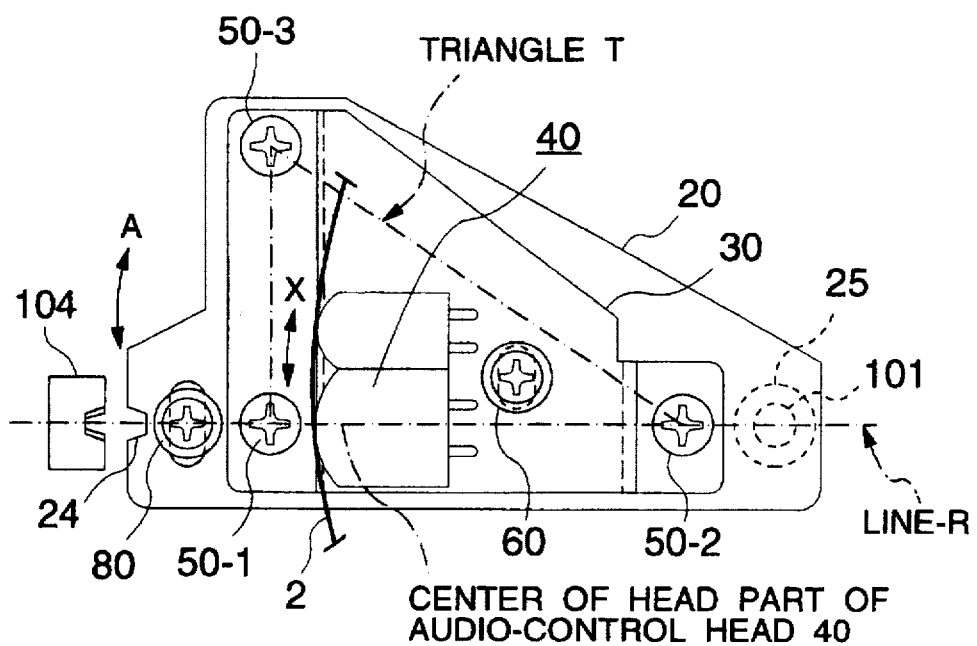
FIG. 3 is a top view of FIG. 2.

Adjustment in the X-direction shown in FIG. 3, i.e., position adjustment in a direction parallel to the base 100 (in a moving direction of the magnetic tape 2), is the most important for positional accuracy of the audio-control head 40.

The X-direction adjustment is performed, as described above, by inserting an adjustment jig of, for example, a screwdriver type, between the notch 24 of the synthetic resin part 20 and the projection part 104 on the base 100, and rotating the adjustment jig.

As a result, the synthetic resin part 20 is rotated around the through hole 101 of the base 100 in a direction A shown in FIG. 3. At this time, the three adjustment screws 50 for maintaining the head plate 30 at a height from the base 100 are slid on the surface of the base 100, and consequently, the head plate 30 is moved in parallel to the base 100.

That is to say, the X-direction adjustment according to the invention does not affect position adjustments in the Z-direction, θ-direction, azimuth direction and so forth.

Moreover, as shown in FIG. 3, since the spring fixing screw 60 is located within a triangle T defined by the three adjustment screws 50-1 to 50-3, the three adjustment screws 50-1 to 50-3 are pressed toward the base 100 by the spring 70 (FIG. 1, FIG. 2) which is closely fitted on the spring fixing screw 60, so that the screw parts 51 will not be loose. Therefore, the amount of the X-direction adjustment does not vary in accordance with time, and thus, a high reliability can be obtained.

The position of the audio-control head 40 in the Z-direction is determined by a distance h shown in FIG. 2 (a distance from a lower end of the magnetic tape 2 to an upper end of the control head 43).

In this embodiment, as shown in FIG. 3, the adjustment screw 50-1 is located at a position on a straight line (Line-R) connecting the center of the control head 43 of the audio-control head 40 with the center of the through hole 101, which position is closer to the control head 43. Therefore, the Z-direction position can be directly adjusted by the length of engagement of the adjustment screw 50-1.

That is to say, the amount of the Z-direction position adjustment is unlikely to affect the amounts of the X-direction adjustment, the θ-direction adjustment (tilt adjustment) and the azimuth direction adjustment.

The θ-direction adjustment is effected by inclining the audio-control head 40 at an angle θ, as shown in FIG. 2, to thereby provide the optimum contact state of the magnetic tape 2 with the audio head 42 (FIG. 2).

This adjustment is conducted on the basis of the lengths of engagement of the two adjustment screws 50-1 and 50-2 on the Line-R in FIG. 3. However, when the length of engagement of the adjustment screw 50-2 which is closer to the through hole 101 of FIG. 2 is controlled, the head plate 30 is moved around the adjustment screw 50-1 closer to the control head 43, so that the above-mentioned distance h of the Z-direction position adjustment will be hardly affected. Therefore, when the Z-direction position is re-adjusted by the adjustment screw 50-1, the re-adjustment can be easily conducted with a small re-adjustment amount.

The azimuth angle is an angle of inclination of the audio-control head 40 from the moving direction of the magnetic tape 2, and is adjusted mainly on the basis of the length of engagement of the adjustment screw 50-3 shown in FIGS. 1 and 3.

After the above-described adjustments are finished, a fixing screw 80 is passed through the long-shape hole 23 of the synthetic resin part 20 and driven in the tapped hole 103 (FIG. 2) in the base 100, thus securely fastening the synthetic resin part 20 on the base 100.

According to the present invention, there can be provided a head fixing device for the audio-control head 40 which has a considerably simplified structure and can reduce the number of adjustment procedures.

Figure 5A:
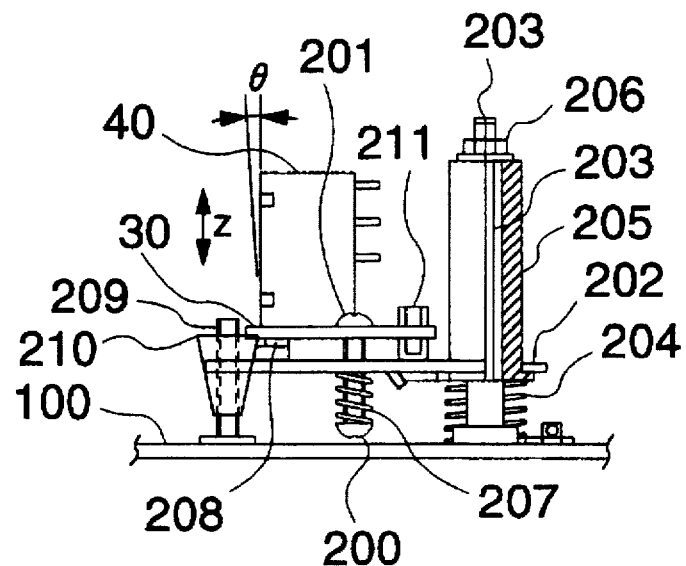
FIGS. 5A and 5B are structural views showing a conventional head fixing device.
Figure 5B:
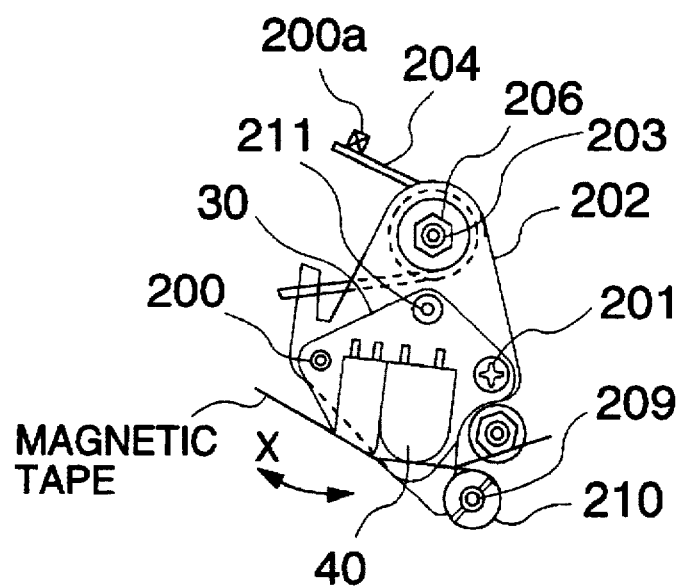

For example, the number of component parts can be decreased to an almost half of that of the conventional device shown in FIGS. 5A and 5B. This is achieved by employing the synthetic resin part 20 in place of the head fixing plate 202 of the conventional device, and forming the rotary shaft, the fixed part 25 and so forth integrally with the synthetic resin part 20 on the base 100, and also, omitting the shaft of the head fixing plate 202, the taper nut and the like.

Moreover, the number of adjustment procedures can be decreased to a half or less of that of the conventional device shown in FIGS. 5A and 5B. The X-direction adjustment of the audio-control head 40 can be effected in one operation by means of a simple screwdriver-type jig without affecting the amounts of the other adjustments. Also, the height adjustment, the θ adjustment and the azimuth adjustment can be performed substantially individually by the adjustment screws 50-1 to 50-3 so that re-adjustments can be omitted or simplified.

What is claimed is:

1. A magnetic recording and reproduction apparatus which effects recording/reproduction of a magnetic tape by a magnetic head provided on a rotary cylinder and effects recording/reproduction of audio signals and control signals by an audio-control head mounted on a head plate at a position different from a position of said rotary cylinder, comprising a synthetic resin part provided on a member having a through hole and on which said rotary cylinder is mounted, said synthetic resin part being molded of a resin integrally with a shaft part formed in the through hole in said member and a fixed part on a bottom surface of said member which is a remote side from the head plate, and an adjustment screw for height adjustment of the audio-control head, an adjustment screw for inclination angle adjustment of the audio-control head and an adjustment screw for azimuth angle adjustment of the audio-control head, wherein each of the adjustment screws has a cylindrical part on a tip thereof and are driven in respective tapped holes formed in the head plate on which said audio-control head is mounted, said cylindrical parts of the adjustment screws being inserted in respective holes bored through said synthetic resin part, so as to abut the surface of said member such that said head plate is fixed to said synthetic resin part to move said head plate and said synthetic resin part together parallel to said member, and the adjustment of the position of the audio-control head with respect to a moving direction of the magnetic tape is effectable by rotating said synthetic resin part around said through hole.

2. A magnetic recording and reproduction apparatus according to claim 1, wherein said adjustment screw for adjusting the height of the audio-control head and said adjustment screw for adjusting the inclination angle of the audio-control head are located a positions on a straight line passing the center of said through hole and the center of a control head in said audio-control head, each of which positions is on one of the front and rear sides of the audio-control head.

* * * * *